United States Patent
Shimokawa et al.

(10) Patent No.: US 10,464,250 B2
(45) Date of Patent: Nov. 5, 2019

(54) MOLDING APPARATUS

(71) Applicants: Takuya Shimokawa, Nagakute (JP); Takashi Imai, Souka (JP); Kaoru Shimomura, Nisshin (JP)

(72) Inventors: Takuya Shimokawa, Nagakute (JP); Takashi Imai, Souka (JP); Kaoru Shimomura, Nisshin (JP)

(73) Assignees: TOYOTA JIDOSHA KABUSHIKI KAISHA, Toyota-shi (JP); PLACO CO., LTD., Saitama-shi (JP); TOYOTA PRODUCTION ENGINEERING CORPORATION, Munakata-shi (JP)

( * ) Notice: Subject to any disclaimer, the term of this patent is extended or adjusted under 35 U.S.C. 154(b) by 314 days.

(21) Appl. No.: 15/604,135

(22) Filed: May 24, 2017

(65) Prior Publication Data

US 2017/0341286 A1 Nov. 30, 2017

(30) Foreign Application Priority Data

May 25, 2016 (JP) .................. 2016-104724

(51) Int. Cl.
*B29C 49/04* (2006.01)
*B29C 48/32* (2019.01)
(Continued)

(52) U.S. Cl.
CPC .............. *B29C 49/04* (2013.01); *B29C 49/32* (2013.01); *B29K 2105/0067* (2013.01); *B29K 2105/258* (2013.01); *B29L 2031/7172* (2013.01)

(58) Field of Classification Search
CPC .......... B29C 2049/047; B29C 48/0017; B29C 48/327; B29C 48/325; B29C 49/04; B29C 48/09; B29C 48/32
See application file for complete search history.

(56) References Cited

U.S. PATENT DOCUMENTS 3,281,896 A * 11/1966 Meyer ................... B21C 25/00
425/466
4,124,351 A 11/1978 Garbuio
(Continued)

FOREIGN PATENT DOCUMENTS

CA 2297389 7/2000
EP 0945245 A1 * 9/1999 ............. B29C 49/04
(Continued)

OTHER PUBLICATIONS

U.S. Office Action dated Jun. 20, 2019 in U.S. Appl. No. 16/196,666, 8 pages.

*Primary Examiner* — Robert B Davis
(74) *Attorney, Agent, or Firm* — Oblon, McClelland, Maier & Neustadt, L.L.P.

(57) ABSTRACT

A molding apparatus includes: a die; a core disposed at the inner side of the die; a slider housed in a die recess provided in the die; a rod having a leading end portion housed in a slider recess formed in a face of the slider, the leading end portion of the rod being unconnected with the slider; and a movement mechanism, the die including a wall portion that forms part of an inner wall of the die recess, and the slider recess having a shape that widens on progression toward an outer side in a radial direction of the die or that runs along a radial direction of the die.

9 Claims, 14 Drawing Sheets

(51) Int. Cl.
 *B29C 49/32* (2006.01)
 *B29K 105/00* (2006.01)
 *B29L 31/00* (2006.01)

(56) References Cited

U.S. PATENT DOCUMENTS

| | | | |
|---|---|---|---|
| 6,773,249 B1 * | 8/2004 | Przytulla | B29C 48/30 425/141 |
| 2014/0113016 A1 | 4/2014 | Ito et al. | |
| 2015/0021811 A1 | 1/2015 | Eckhardt et al. | |
| 2017/0341286 A1 | 11/2017 | Shimokawa et al. | |
| 2019/0160724 A1 * | 5/2019 | Shimokawa | B29C 48/0017 |

FOREIGN PATENT DOCUMENTS

| | | | | |
|---|---|---|---|---|
| GB | 1183027 A | * | 3/1970 | B29C 48/30 |
| GB | 2089278 A | * | 6/1982 | B29C 48/30 |
| JP | 7-144355 | | 6/1995 | |
| JP | 8-323843 | | 12/1996 | |
| JP | 5427834 B2 | | 2/2014 | |
| JP | 2017-209878 | | 11/2017 | |
| JP | 2017-222181 | | 12/2017 | |

* cited by examiner

MOLDING APPARATUS

CROSS-REFERENCE TO RELATED APPLICATION

This application claims priority under 35 USC 119 from Japanese Patent Application No. 2016-104724 filed on May 25, 2016, the disclosure of which is incorporated by reference herein.

TECHNICAL FIELD

Exemplary embodiments relate to a molding apparatus.

BACKGROUND ART

Japanese Patent Application Laid-Open (JP-A) No. H08-323843 describes a parison molding apparatus in which molten resin is passed through a resin flow path formed by a core and a die, and the size of a flow-regulating portion of the resin flow path is changed and the thickness of a parison is adjusted by causing plural divided ring portions provided in a ring-shaped groove of the die to slide.

In the parison molding apparatus, the divided ring portions are each caused to slide by a cylinder through a link portion. The divided ring portions are each lowered when a rod of the cylinder advances forward.

SUMMARY

In the structure described in JP-A No. H08-323843, each cylinder, this being an actuator, is fixed to the main body of the die, and the cylinder is connected by the link portion with the respective divided ring portion. Thus, when the actuator (cylinder) moves in a direction away from the core (toward the outer side in the radial direction) due to thermal expansion of the die, the divided ring portion follows the movement and also moves toward the outer side in the radial direction. A gap then develops between the divided ring portions and part of the die positioned at the core side (the inner side in the radial direction) thereof, and there is a concern that molten resin might leak out through this gap.

A member that biases each divided ring portion toward the core side, for example, may be provided in order to suppress the development of such a gap. However, providing a biasing device increases the size and increases the cost of the molding apparatus.

In an embodiment, a molding apparatus is provided that is capable of suppressing the leaking out of molten resin when a die has expanded, while suppressing an increase in size and an increase in cost thereof.

A molding apparatus according to a first aspect includes:

a hollow circular cylindrical die having a first end and a second end in an axial direction of the die;

a core disposed at an inner side of the die, the core being movable relative to the die in the axial direction of the die, and a flow path for molten resin running from a first end side to a second end side in the axial direction of the die being formed between the core and the die;

a slider housed in a die recess provided in the die in a state in which there is a gap in a radial direction of the die between the slider and the die, the die recess being open toward the second end side in the axial direction of the die, and the slider being slidable along the axial direction of the die;

a rod having a leading end portion housed in a slider recess formed in a face of the slider, the face of the slider being at an opposite side from the core side, the leading end portion of the rod being unconnected with the slider, and the rod being configured to cause the slider to slide along the axial direction of the die due to the leading end portion moving along the axial direction of the die; and a movement mechanism attached to the die, the movement mechanism being configured to move the leading end portion of the rod along the axial direction of the die, the die including a wall portion that forms part of an inner wall of the die recess and that is positioned at a core side of the slider, and the slider recess having a shape that widens on progression toward an outer side in the radial direction of the die or that runs along the radial direction of the die.

In the molding apparatus according to the first aspect, molten resin flows through the flow path formed between the die and the core, whereby the resin is molded. In the slider housed in the die recess, the slider recess is formed in a face at an opposite side from the core side. The leading end portion of the rod is housed in the slider recess in a state in which the leading end portion of the rod is unconnected with the slider. The slider can be caused to slide along the axial direction of the die by moving the leading end portion of the rod along the axial direction of the die using the movement mechanism. The width of the flow path can be adjusted by moving the slider along the axial direction of the die.

The wall portion formed at the die and forming part of the inner wall of the die recess is positioned at the core side of the slider, and therefore, movement of the slider toward the core side is limited by the wall portion.

The slider recess has a shape that widens on progression toward the outer side in the radial direction of the die, or that runs along the radial direction thereof. In other words, boundary lines of the slider recess of the slider, which are shown at the first end side and the second end side in the axial direction of the die in a cross-section along the axial and radial directions of the die, either slope in a direction that increases the distance between the boundary lines on progression toward the outer side in the radial direction of the die, or run along the radial direction of the die. Here, "slope in a direction that increases the distance between the boundary lines" means that, among the boundary lines of the slider recess, the boundary line at the first end side in the axial direction of the die slopes toward the first end side in the axial direction of the die on progression toward the outer side in the radial direction of the die, and the boundary line at the second end side in the axial direction of the die slopes toward the second end side in the axial direction of the die on progression toward the outer side in the radial direction of the die. Moreover, "run along the radial direction of the die" means that the boundary lines at the first end side in the axial direction and the second end side in the axial direction run along the diameter (lines orthogonal to the axis) of the hollow circular cylindrical die. Boundary lines of the slider recess are also shown in a cross-section orthogonal to the axial direction of the die. These boundary lines also either slope in a direction that increases the distance between the boundary lines on progression toward the outer side in the radial direction, or run along the radial direction of the die. That is, the pair of boundary lines of the slider recess do not slope in a direction that decreases the distance between the boundary lines on progression toward the opposite side from the core side. Thus, even if the movement mechanism provided to the die moves toward the outer side in the radial direction of the die and the rod moves toward the outer side in the radial direction of the die when the die has thermally expanded, the leading end of the rod does not catch on a portion of the slider forming the slider recess. Moreover, the rod is not connected with the slider. As a result, force in a direction away from the wall portion does not act on the slider, and therefore, the development of a gap between the slider and the wall portion can be suppressed, and the leaking out of molten resin through such a gap can be suppressed. Since the leaking out of molten resin can be suppressed without using a member to bias the slider toward the core side (in a direction pressing the wall portion), an increase in size and an increase in cost of the molding apparatus can be suppressed. Here, "slope" refers to forming an angle with respect to the radial direction of the die. In the description of the slider recess above, the radial direction of the die refers to a direction normal to the die axis from the center of the slider recess. Further, the slider recess may have a portion at the inner side in the radial direction of the die and a portion at the outer side in the radial direction of the die, and may have a shape that widens on progression toward the outer side in the radial direction of the die at the portion at the inner side in the radial direction of the die and that runs along the radial direction of the die at the portion at the outer side in the radial direction of the die.

A molding apparatus according to a second aspect includes the first aspect, in which, in the slider recess, a tangential plane at a contact portion at which the leading end portion of the rod contacts the slider is a sloped plane that slopes toward an open side of the die recess on progression toward the outer side in the radial direction of the die.

In the slider recess, the tangential plane at the contact portion at which the leading end portion of the rod contacts the slider is a sloped plane that slopes toward the open side of the die recess on progression toward the outer side in the radial direction of the die. As a result, part of the force from the leading end portion of the rod acting on the slider when the leading end portion of the rod moves toward the second end side in the axial direction of the die can act through the sloped plane as force moving the slider toward the core side. The slider is accordingly pressed against the wall portion, and therefore, the development of a gap between the slider and the wall portion can be more reliably suppressed.

A molding apparatus according to a third aspect includes the second aspect, in which the movement mechanism includes a support shaft that supports an intermediate portion of the rod so as to permit rotation of the rod, and an actuator configured to move a rear end side of the rod toward the first end side in the axial direction of the die.

The rod is rotatably supported by the support shaft, and the rear end side of the rod is moved to the first end side in the axial direction of the die by the actuator, whereby the leading end side of the rod can be moved toward the second end side in the axial direction of the die.

Since the rod is supported by the support shaft, there is no need for a mechanism to retain the rod slidable, unlike in a sliding structure. As a result, the structure can be simplified.

A molding apparatus according to a fourth aspect includes the third aspect, in which the actuator is configured to move the rear end side of the rod toward the first end side in the axial direction of the die from an orientation in which the rod runs along the radial direction of the die.

As a result, the rod is rotated from an orientation running along the radial direction of the die to slide the slider, and therefore, a large sliding amount of the slider with respect to a rotation angle of the rod can be secured.

Since the slider recess has a sloped face, when the leading end portion of the rod moves toward the outer side in the radial direction accompanying movement toward the second end side in the axial direction of the die, the slider can be pressed toward the core side by part of the force acting on the slider from the leading end portion of the rod.

According to the above configuration, leaking out of molten resin can be suppressed when the die has expanded, while suppressing an increase in size and an increase in cost of the molding apparatus.

DETAILED DESCRIPTION

Hereinbelow, a molding apparatus 22 according to a first embodiment is described with reference to the attached drawings.

Figure 1:
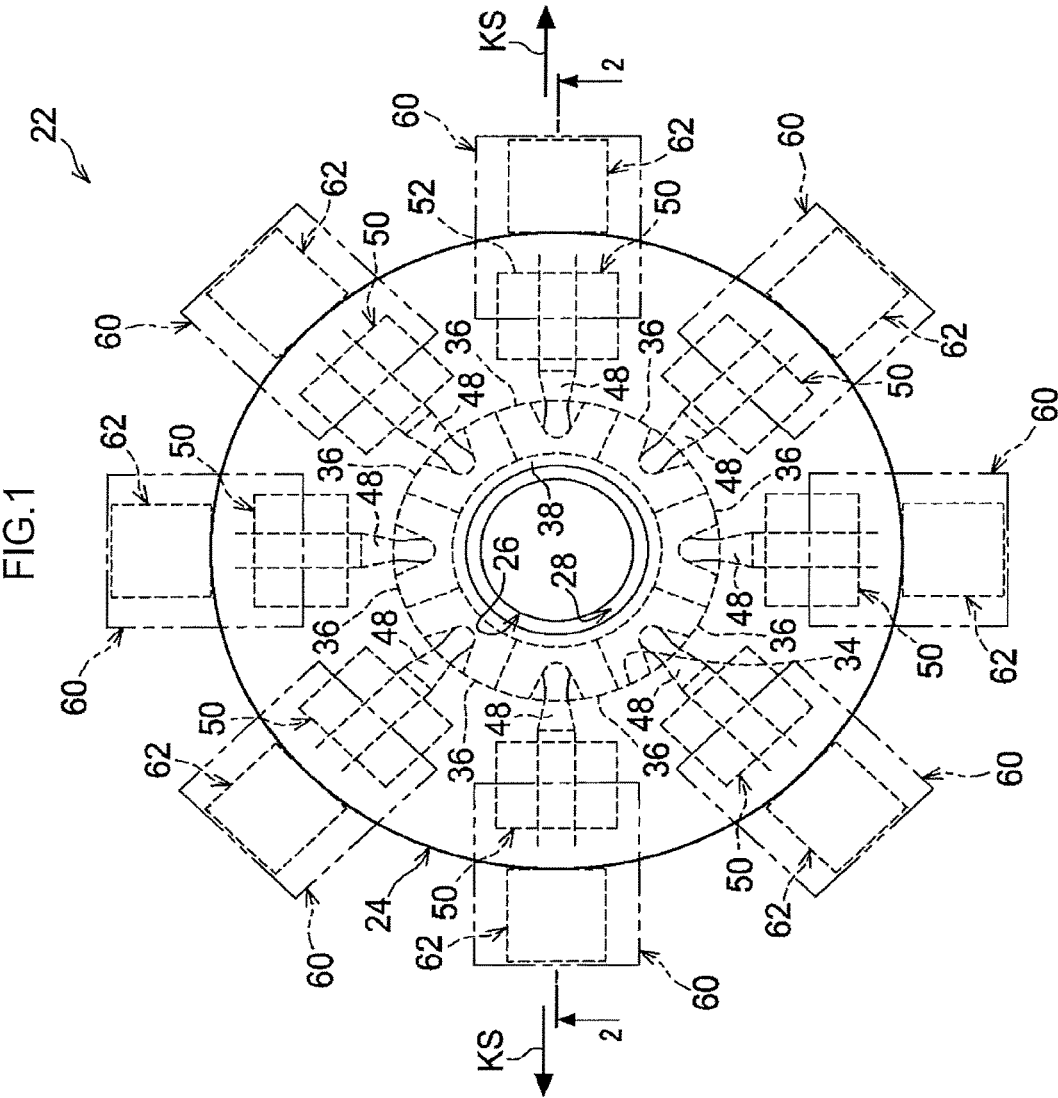
FIG. 1 is a plan view schematically illustrating a molding apparatus according to a first embodiment.
Figure 2:
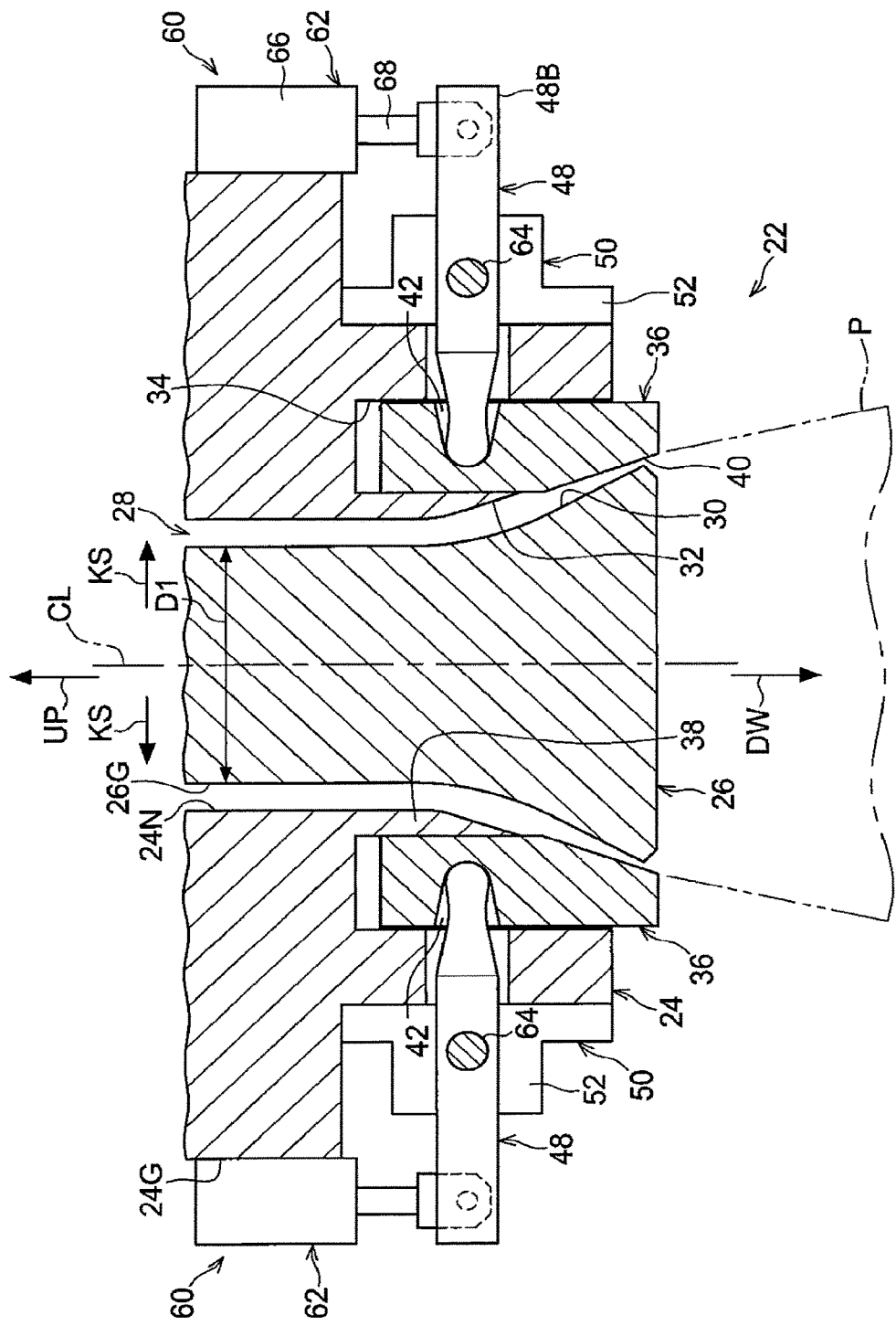
FIG. 2 is a cross-sectional view illustrating a molding apparatus according to the first embodiment taken along line 2-2 of FIG. 1.

As illustrated in FIG. 1 and FIG. 2, the molding apparatus 22 according to the first embodiment includes a hollow circular cylindrical die 24, and a core 26 disposed at an inner side of the die 24. The core 26 has a substantially circular column shape or a substantially hollow circular cylindrical shape, and is disposed coaxially to the die 24 (i.e., central lines CL of the die 24 and the core 26 are aligned with each other).

When using the molding apparatus 22, the molding apparatus 22 is disposed, for example, such that a first end side in the axial directions of the die 24 and the core 26 is at the upper side, and a second end side in the axial directions thereof is at the lower side. That is, the central lines CL are oriented along the vertical direction. However, the orientation of the molding apparatus 22 when in use is not limited thereto, and the central lines CL may, for example, be disposed oriented along the horizontal direction, or oriented at an angle with respect to the horizontal direction. In the below explanation, simple reference to the "axial direction" refers to the axial directions of the die 24 and the core 26, which are aligned with extension directions of the central lines CL. Simple reference to "first end side" or "second end side" means the first end side or the second end side in the axial directions of the die 24 and the core 26, which are aligned with the first end side or the second end side of the molding apparatus 22. Reference to the "radial direction" means the radial directions of the die 24 and the core 26. In the drawings, the upper side of the molding apparatus 22 is shown by the arrow UP, the lower side thereof by the arrow DW, and the outer side in the radial direction thereof by the arrows KS. Simple reference to "upper side" or "lower side" means the "upper side" or "lower side" in FIG. 2, FIG. 3, and the like.

Figure 3:
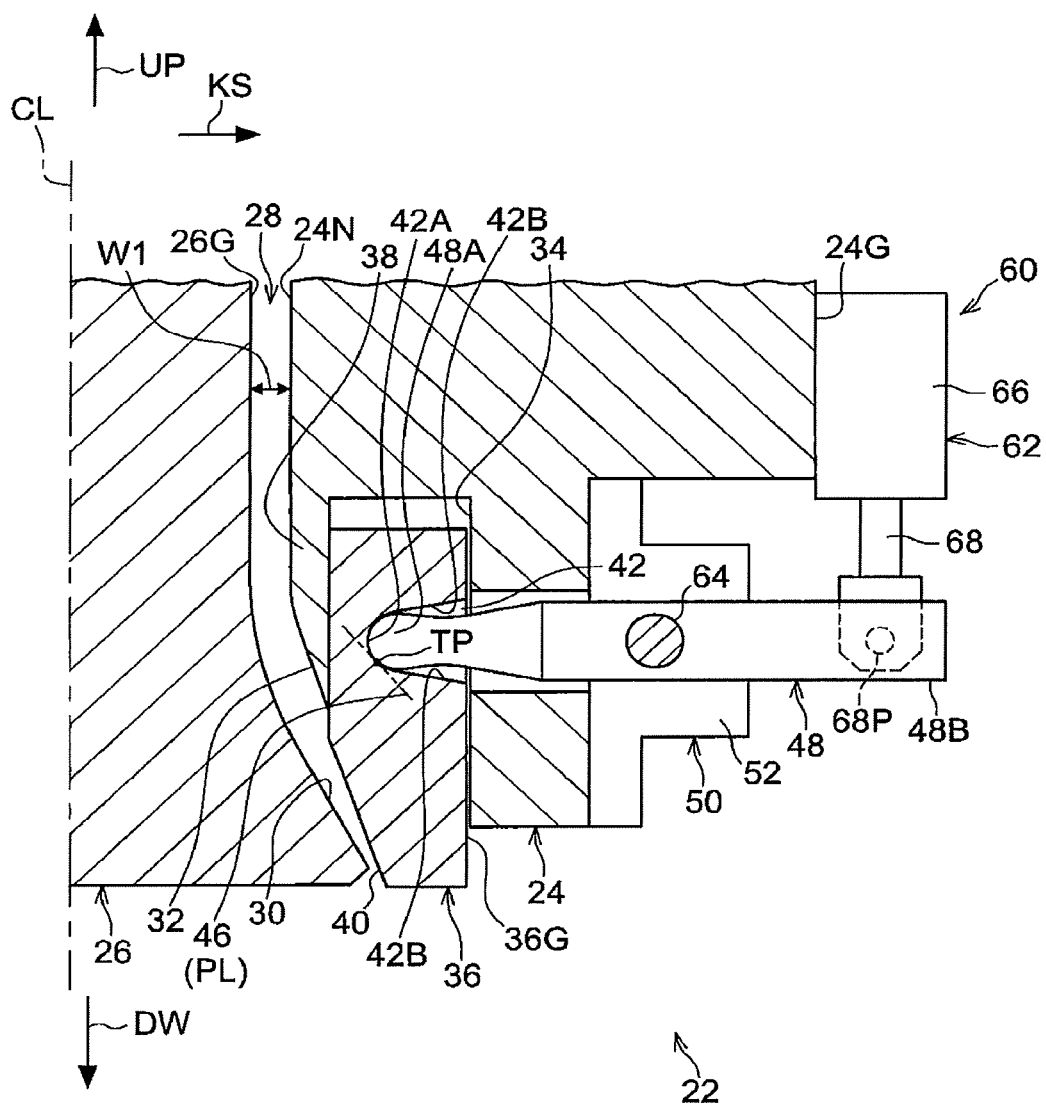
FIG. 3 is a partially enlarged cross-sectional view illustrating a molding apparatus according to the first embodiment.

As also illustrated in FIG. 3, a flow path 28 for molten resin is formed between an inner circumferential face 24N of the die 24 and an outer circumferential face 26G of the core 26. Molten resin flows through the flow path 28 from the first end side to the second end side (from the upper side to the lower side in FIG. 2 and FIG. 3), whereby a resin sheet P with a specific shape is molded. Here, even when the molding apparatus 22 is disposed with the central lines CL oriented along the horizontal direction, or oriented at an angle with respect to the horizontal direction, molten resin flows through the flow path 28 from the first end side to the second end side, whereby a resin sheet with a specific shape is molded.

Figure 4:
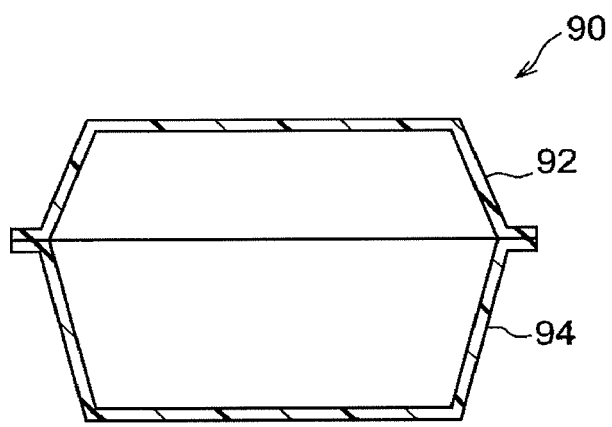
FIG. 4 is a cross-sectional view illustrating a fuel tank employing a resin sheet molded using a molding apparatus according to the first embodiment.

The resin formed into a specific shape in the molding apparatus 22 is employed as a member forming a fuel tank 90 such as that illustrated in FIG. 4, for example. In such cases, the fuel tank 90 may be molded with a desired shape by forming a tube-shaped resin sheet in the molding apparatus 22, setting this in a mold, and blowing air inside the tube-shaped resin sheet (blow molding). Alternatively, plural sheet shaped resin sheets may be obtained by sectioning the tube-shaped resin sheet at desired positions. In such cases, fuel tank configuration bodies 92, 94 may be each molded with a desired shape by setting two of the obtained sheet-shaped resin sheets in a mold used for molding, and blowing air between the resin sheets.

In the molding apparatus 22, the core 26 is movable along the axial direction (the arrow UP direction and the opposite direction therefrom, this being the arrow DW direction) of the die 24 using a non-illustrated movement mechanism.

A core increasing diameter portion 30 that gradually increases in diameter D1 (see FIG. 2) on progression toward the second end side is formed at the second end side of the outer circumferential face 26G of the core 26. A flow path width W1 of the flow path 28 between the core increasing diameter portion 30 and a die increasing diameter portion 32, as well opposing faces 40 of separators 36, which are described later, changes on progression toward the second end side. The flow path width W1 can be changed by moving the core 26 along the axial direction.

A die recess 34 being open toward the second end side is formed in the die 24. As illustrated in FIG. 1, the die recess 34 has a continuous ring shape around the circumferential direction of the die 24.

Plural separators 36 are housed in the die recess 34. As illustrated in FIG. 1, the separators 36 (eight in the illustrated example) are disposed arrayed around the circumferential direction of the die 24. Each separator 36 is formed in a circular arc shape as viewed from the axial direction. Together, the plural separators 36 surround the core 26 in a ring shape. The separators 36 are an example of a slider.

As illustrated in FIG. 2 and FIG. 3, a wall portion 38 is formed at the die 24, and the wall portion 38 is positioned at a core 26 side of the separators 36. The wall portion 38 extends out from the first end side to the second end side (from the upper side downward) of the die recess 34, and the wall portion 38 forms part of an inner wall of the die recess 34.

Figure 5:
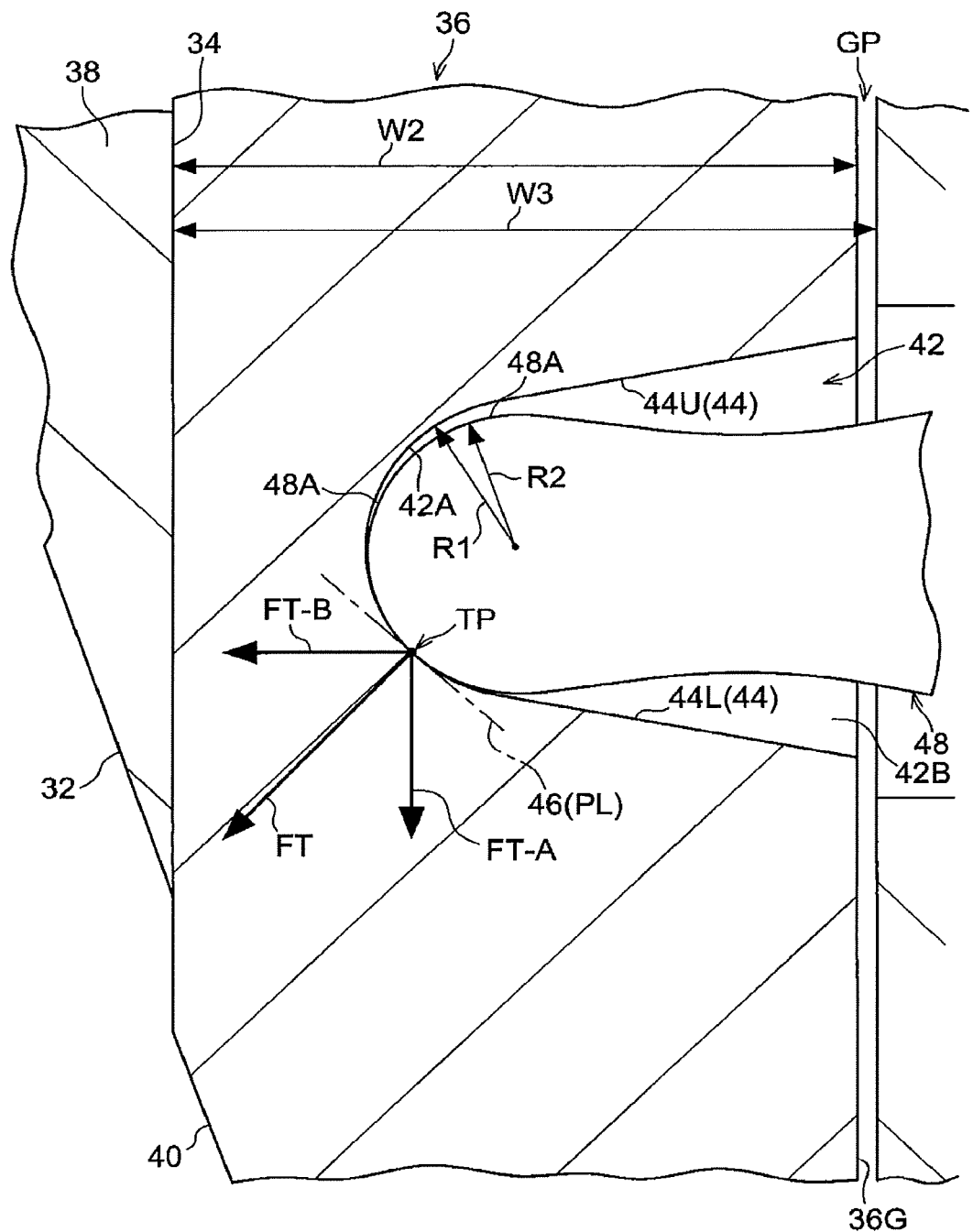
FIG. 5 is a magnified cross-sectional view illustrating the vicinity of a separator recess in a molding apparatus according to the first embodiment.

As illustrated in FIG. 5, a width W2 (radial direction length) of each separator 36 is shorter than a width W3 (radial direction spacing) of the die recess 34. A gap GP in the radial direction is therefore present between the separators 36 and the die recess 34. As described later, each separator 36 is pressed against the wall portion 38 due to the separator 36 being pressed by a rod 48 toward the inner side in the radial direction. Note that the gap GP is shown in FIG. 5 to be wider than it actually is.

The height of the separator 36 is determined so as to a portion of the separator 36 at the second end side jut out further toward the second end side than the wall portion 38, and face the core 26.

As illustrated in FIG. 3, each opposing face 40, sloping in a direction that increases the distance from the core 26 on progression toward the second end side, is formed at a portion of the separator 36 facing the core increasing diameter portion 30. The flow path width W1 between the core increasing diameter portion 30 and the opposing faces 40 can be changed by moving the core 26 along the axial direction (the arrow UP direction and the arrow DW direction). Molten resin flowing through the flow path 28 can be sectioned at a desired position by causing the opposing faces 40 to contact the core increasing diameter portion 30.

An opposite face from the core side (the side contacting the wall portion 38) of each separator 36 configures an outer circumferential face 36G positioned at an outer circumferential side when the plural separators 36 are viewed altogether. A separator recess 42 is formed in the outer circumferential face 36G of each separator 36. The separator recesses 42 are an example of a slider recess, similarly to the separators 36 being an example of a slider.

Each separator recess 42 is recessed from the outer circumferential face 36G of the separator 36 toward the inner side in the radial direction (in a direction toward the central lines CL). As illustrated in FIG. 5, a bottom side (a location near to the central lines CL, on the left side in FIG. 5) of the separator recess 42 configures a curved face 42A that curves in a substantially semispherical shape. The curved face 42A is shown as a circular arc shape in a cross-section of the separator 36 along the axial and radial directions. In the following explanation, the radius of the curved face 42A is referred to as R1.

As illustrated in FIG. 3 and FIG. 5, an open side (the portion furthest from the central lines CL) of the separator recess 42 is continuous to the curved face 42A, and configures an increasing diameter face 42B that widens in a circular truncated cone shape on progression toward the outer circumferential face 36G of the separator 36. The increasing diameter face 42B is shown as two boundary lines 44, these being at the upper side (the first end side in the axial direction of the die) and at the lower side (the second end side in the axial direction of the die) in a cross-section of the separator 36 along the axial and radial directions (the cross-section illustrated in FIG. 3). The two boundary lines 44 each slope in a direction that increases the distance between the boundary lines on progression toward the outer side in the radial direction of the die 24. Specifically, an upper side boundary line 44U slopes upward toward the outer side in the radial direction of the die 24, and a lower side boundary line 44L slopes downward toward the outer side in the radial direction of the die 24. The increasing diameter face 42B is also shown as two boundary lines sloping so as to widen toward the outer side in the radial direction of the die 24 in a cross-section in a direction orthogonal to the central lines CL. The separator recess 42 therefore has a shape that widens on progression from the inner side in the radial direction toward the outer side in the radial direction. That is, in the molding apparatus according to the first embodiment, a slider face at the slider recess includes a bottom side portion and an open side portion, and the bottom side portion has a curved face and the open side portion has an increasing diameter face that is continuous to the curved face and widens in a circular truncated cone shape on progression toward an outer circumferential face of the slider.

As illustrated in FIG. 1 to FIG. 3, the molding apparatus 22 includes plural (eight in the present embodiment) rods 48 that each correspond to one of the separators 36.

Support members 50, each including a pair of support plates 52, are attached to the die 24 so as to each correspond to one of the rods 48. Each rod 48 is rotatably supported by the die 24 at an intermediate portion about a support shaft 64 provided to the support plates 52. A leading end portion 48A of each rod 48 is housed in the separator recess 42 in a state in which the leading end portion is not connected with the separator 36 (an unconnected state).

Movement mechanisms 60 that each correspond to one of the rods 48 are included at the outer circumferential side of the die 24. Each movement mechanism 60 includes an actuator 62 and the support shaft 64.

Each actuator 62 includes a cylinder 66 fixed to an outer circumferential face 24G of the die 24. A piston 68 extends out from the cylinder 66. The piston 68 is connected by a pin 68P with a rear end portion 48B of the rod 48, and configured to move along the axial direction (the vertical direction in FIG. 3). When the piston 68 moves toward the first end side in the axial direction (the upper side) due to the actuator 62 being driven, the leading end portion 48A of the rod 48 moves toward the second end side in the axial direction (the lower side). Since the leading end portion 48A of the rod 48 is housed in the separator recess 42, the separator 36 slides toward the second end side in the axial direction (the lower side). In contrast thereto, when the piston 68 moves toward the second end side in the axial direction (the lower side), the separator 36 moves toward the first end side in the axial direction (the upper side).

Figure 6:
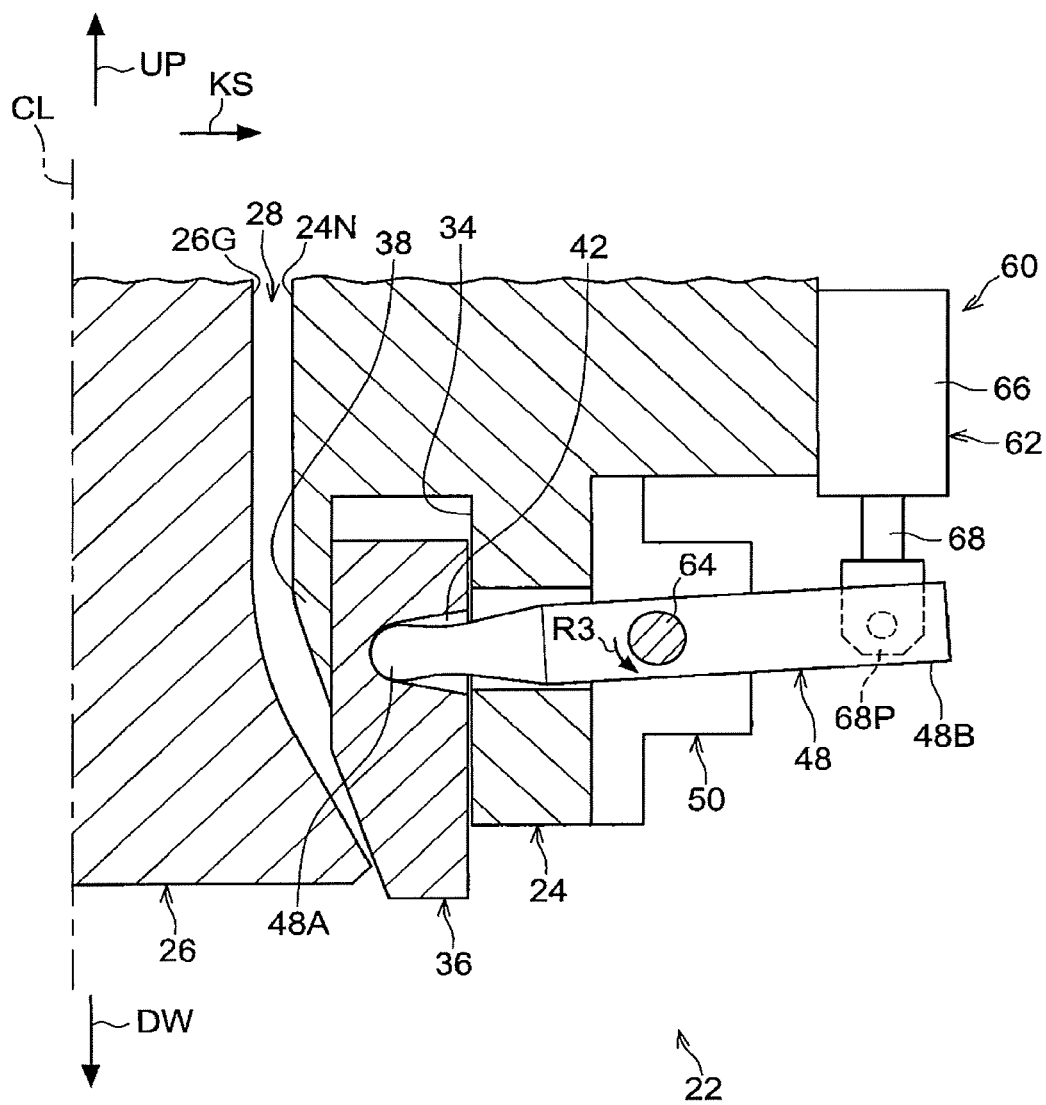
FIG. 6 is a partially enlarged cross-sectional view illustrating a molding apparatus according to the first embodiment.

In the present embodiment, as illustrated in FIG. 3, an orientation in which the length direction of each rod 48 runs along the radial direction of the die 24 configures an initial state. As illustrated in FIG. 6, the orientation (angle) of the rod 48 is set such that the separator 36 moves toward the second end side (the lower side in FIG. 6) by moving the rear end portion 48B of the rod 48 toward the first end side in the axial direction (the upper side in FIG. 6) from the initial state to rotate the rod 48 in the arrow R3 direction.

As illustrated in FIG. 5, the leading end portion 48A of each rod 48 is formed in a spherical shape with a radius R2. The radius R2 of the spherical-shaped leading end portion 48A of the rod 48 is smaller than the radius R1 of the curved face 42A of the separator recess 42. The position of the rod 48 in the initial state is set such that the leading end portion 48A of the rod 48 contacts the curved face 42A of the separator recess 42 at a contact point TP that is further toward the second end side (the lower side) in the axial direction than the center of the rod 48.

In the separator recess 42, a tangential plane PL at the contact point TP at which the leading end portion 48A of the rod 48 contacts the curved face 42A is explained below. The tangential plane PL is a sloped plane 46 that slopes toward an open side (the lower side) of the die recess 34 on progression toward the outer side in the radial direction. When the leading end portion 48A is moved toward the second end side accompanying rotation of the rod 48 in the arrow R3 direction, the contact point TP is also moved toward the second end side, and the angle of the sloped plane 46 (tangential plane PL) becomes gentler. However, even in such cases, a state in which the sloped plane 46 (tangential plane PL) is sloped toward the open side (the lower side) of the die recess 34 on progression toward the outer side in the radial direction is maintained.

Here, the shape of the leading end portion 48A of the rod 48 is not limited to a spherical shape. For example, the rod 48 may be formed in a circular column shape or an angular column shape, in which cases the shape is such that two corner portions would be shown at the leading end portion 48A of the rod 48 in the cross-section illustrated in FIG. 3 and the like. Even if the rod 48 is a circular column shape or an angular column shape, the size (diameter) and position of the rod 48 may be set as appropriate such that the tangential plane PL at the contact point TP of the curved face 42A is configured by the sloped plane 46 that slopes toward the open side (the lower side) of the die recess 34 on progression toward the outer side in the radial direction as described above.

Hereinbelow, operation of the present embodiment is explained.

In the molding apparatus 22 according to the present embodiment, resin is molded into a desired shape due to molten resin flowing through the flow path 28 running from the first end side to the second end side in the axial direction of the die formed between the inner circumferential face 24N of the die 24 and the outer circumferential face 26G of the core 26. The shape (width) of the flow path 28 can be changed by moving the core 26 along the axial direction of the die 24.

Each separator 36 housed in the die recess 34 is caused to slide along the axial direction by the movement mechanism 60. As a result, the width of the flow path 28 can be further changed by changing the position of the opposing face 40 of the separator 36.

In the present embodiment as illustrated in detail in FIG. 5, the tangential plane PL at the contact point TP at which the leading end portion 48A of each rod 48 contacts the curved face 42A of the separator recess 42 is the sloped plane 46 that slopes toward the open side (the lower side) of the die recess 34 on progression toward the outer side in the radial direction. Thus, a force FT acting in a direction normal to the sloped plane 46 when the leading end portion 48A of the rod 48 has moved toward the second end side in the axial direction (the lower side) can be divided into an axial direction component FT-A toward the second end side in the axial direction (the lower side), and a radial direction component FT-B toward the inner side in the radial direction (the side toward the core 26). The radial direction component FT-B acts as a force pressing the separator 36 against the wall portion 38, and therefore, the occurrence of a gap GP between the separator 36 and the wall portion 38 can be suppressed. The wall portion 38 limits movement of the separator 36 toward the inner side in the radial direction (in a direction toward the core 26) to a fixed range.

Figure 7:
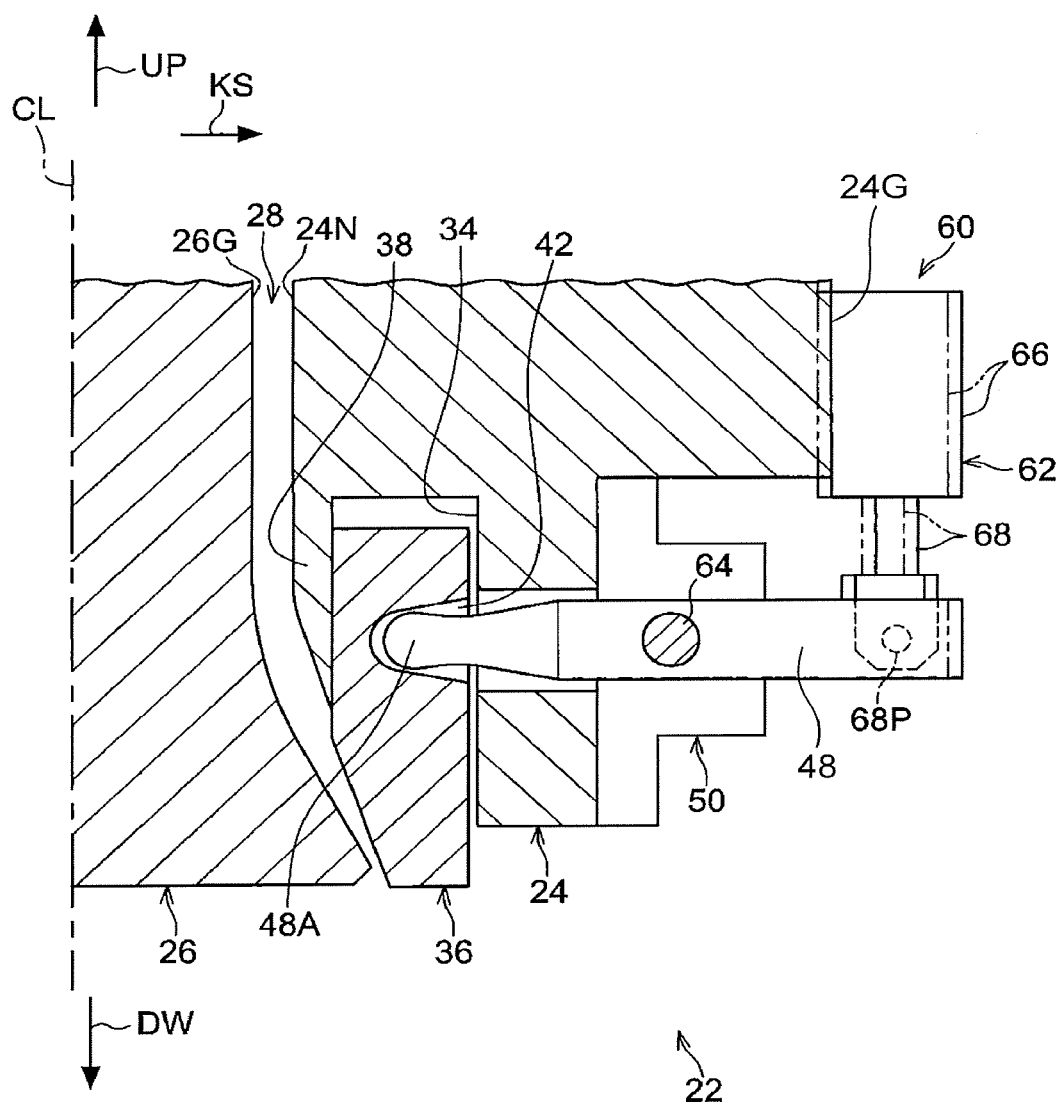
FIG. 7 is a partially enlarged cross-sectional view illustrating a molding apparatus according to the first embodiment.

As illustrated in FIG. 7, the die 24 sometimes deforms due to thermal expansion or the like, such that the outer circumferential face 24G spreads out toward the outer side in the radial direction. Each cylinder 66 and each rod 48 also move toward the outer side in the radial direction.

Figure 8:
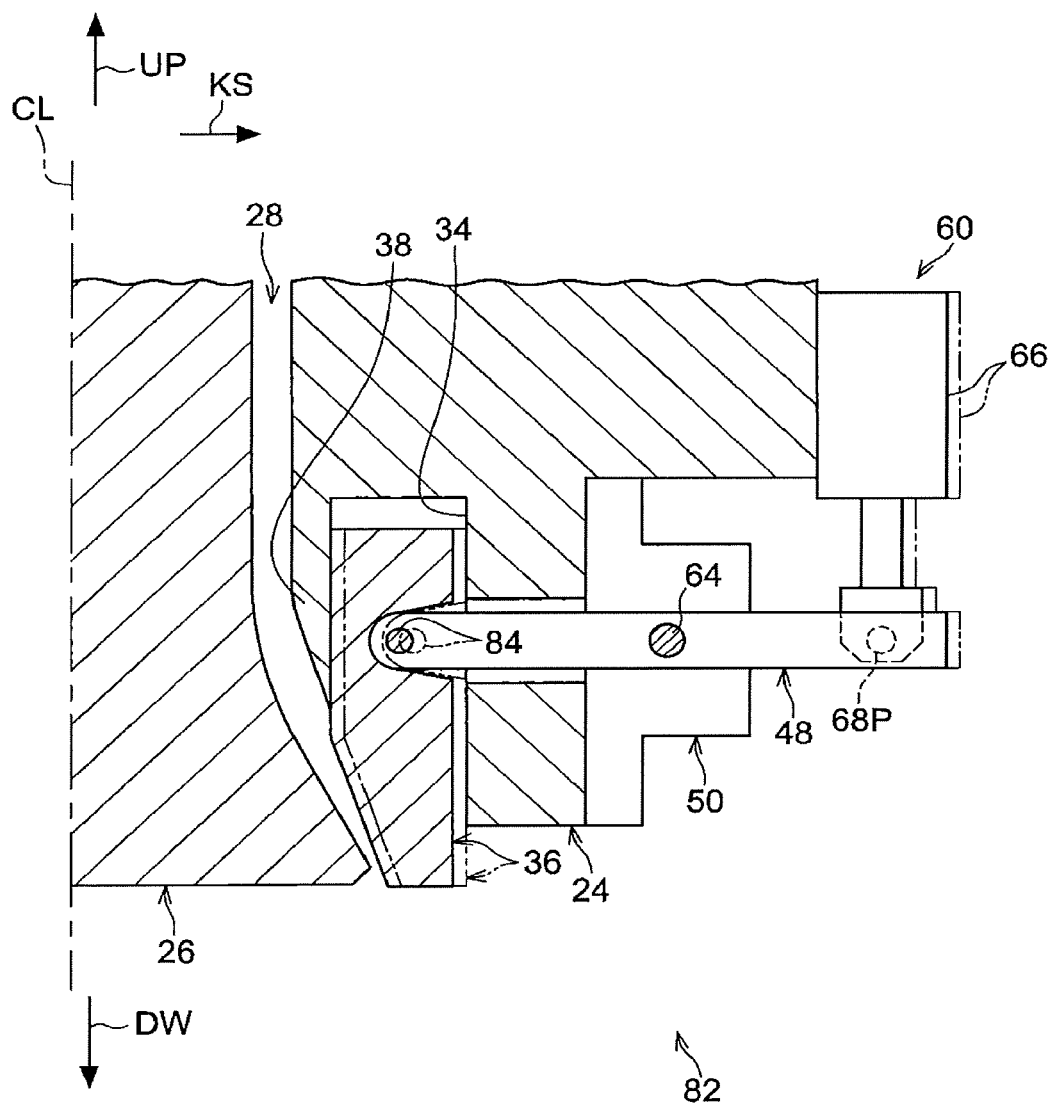
FIG. 8 is a partially enlarged cross-sectional view illustrating a molding apparatus according to a first comparative example.

A molding apparatus 82 with a structure in which each rod 48 is connected by a pin 84 with the separator 36 as illustrated in FIG. 8 is described below as a first comparative example. In the molding apparatus 82 of the first comparative example, when the cylinder 66 moves toward the outer side in the radial direction due to thermal expansion of the die 24 or the like, force from the rod 48 toward the outer side in the radial direction acts on the separator 36 through the pin 84. As illustrated by the double-dotted dashed lines in FIG. 8, there is a concern that a gap might develop between the separator 36 and the wall portion 38 when the separator 36 moves toward the outer side in the radial direction.

Figure 9:
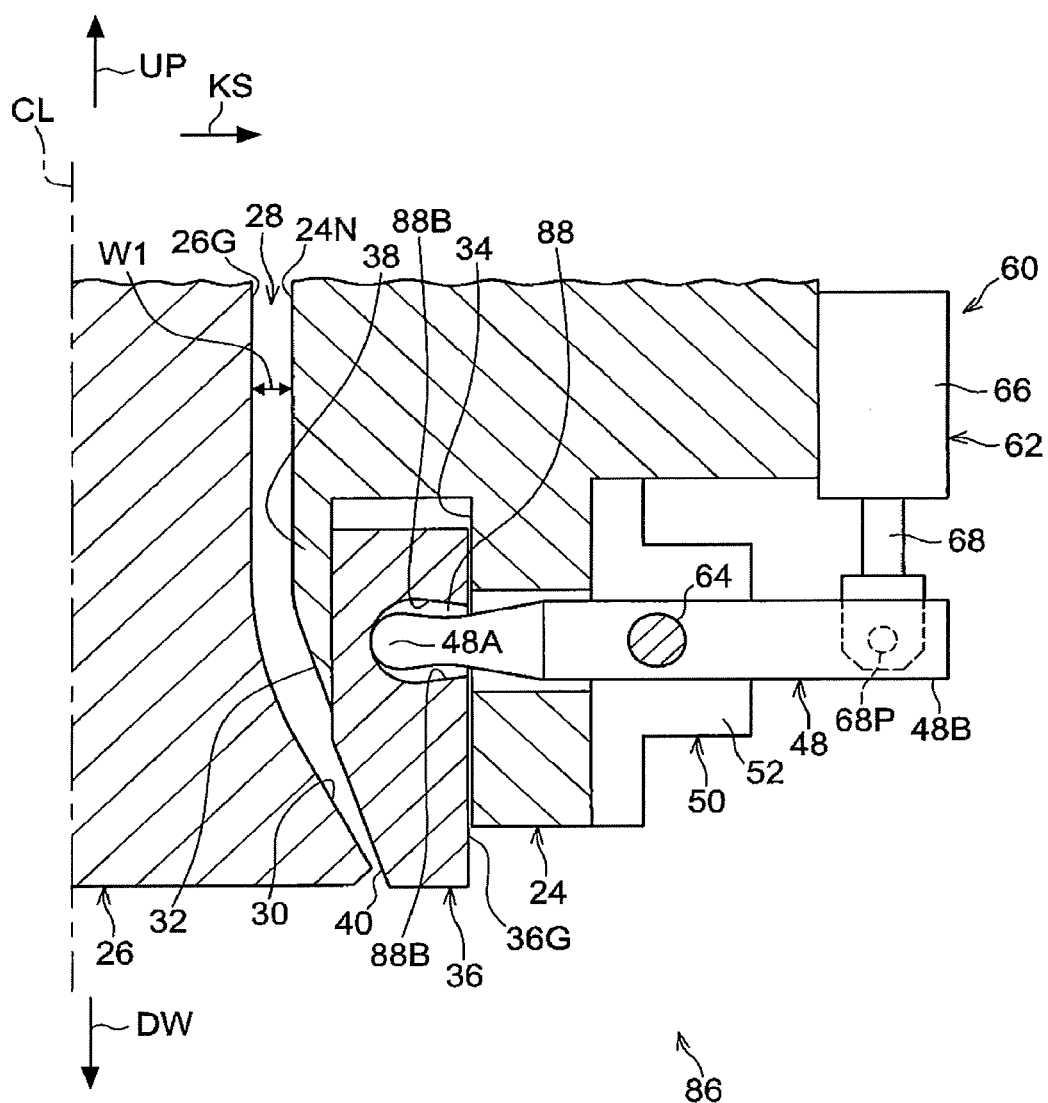
FIG. 9 is a partially enlarged cross-sectional view illustrating a molding apparatus according to a second comparative example.

A molding apparatus 86, in which a separator recess 88 becomes narrower (upper and lower boundary lines 88B shown in cross-section approach each other) on progression toward the outer circumferential face 36G as illustrated in FIG. 9, is described below as a second comparative example. Although the molding apparatus 86 of the second comparative example has a structure in which the rod 48 is not connected with the separator 36, part of the rod 48 attempting to move toward the outer side in the radial direction sometimes catches on the separator 36 depending on the orientation of the rod 48, for example. In particular, part of the rod 48 is more liable to catch on the separator 36 when the rod 48 slopes with respect to the radial direction. Force toward the outer side in the radial direction acts on the separator 36 when the rod 48 catches on the separator 36. There is a concern that a gap might develop between the separator 36 and the wall portion 38 when the separator 36 moves toward the outer side in the radial direction.

In contrast to the first comparative example and the second comparative example, the rod 48 is not connected with the separator 36 in the molding apparatus 22 according to the present embodiment. Moreover, in the molding apparatus 22 according to the present embodiment, the boundary lines 44 of the separator recess 42 shown in the cross-section illustrated in FIG. 5 respectively slope in a direction that increases the distance between the boundary lines on progression toward the outer side in the radial direction. Thus, the rod 48 does not catch on the separator 36, even if the rod 48 moves toward the outer side in the radial direction. In particular, the rod 48 can be suppressed from catching on the separator 36, even when the rod 48 is tilted with respect to the radial direction. Thus, force from the rod 48 toward the outer side in the radial direction does not act on the separator 36, even when the rod 48 moves toward the outer side in the radial direction.

Thus, in the molding apparatus 22 according to the present embodiment, since force toward the outer side in the radial direction does not act on the separator 36, moving of the separator 36 away from the wall portion 38 can be suppressed, and the development of a gap between the separator 36 and the wall portion 38 can be suppressed. This enables molten resin flowing through the flow path 28 to be suppressed from flowing into the gap and leaking out therefrom.

Moreover, in the molding apparatus 22 according to the present embodiment, there is no need to provide a member to bias (press) the separator 36 toward the wall portion 38 so that the separator 36 does not move away from the wall portion 38. As a result, an increase in size and cost of the molding apparatus 22 can be suppressed.

As described above, since the radial direction component FT-B of the force FT, which acts in a direction normal to the sloped plane 46 from the leading end portion 48A of the rod 48, acts as a force pressing the separator 36 toward the wall portion 38, the development of a gap between the separator 36 and the wall portion 38 can be more reliably suppressed. An example is envisaged below in which pressing force toward the outer side in the radial direction from resin flowing through the flow path 28 acts on the separator 36. In such a case, rotation driving force acting on the rod 48, the shape of the curved face 42A, the position of the contact point TP (the angle of the sloped plane 46), and the like may be set such that force from the rod 48 toward the inner side in the radial direction acts on the separator 36 with a greater force than the force toward the outer side in the radial direction.

Explanation follows regarding a second embodiment. In each of the embodiments and modified examples below, similar elements, members, and the like to those in the first embodiment are appended with the same reference numerals and detailed explanation thereof is omitted. An overall structure of the molding apparatus is also similar to that in the first embodiment, and so illustration is omitted.

Figure 10:
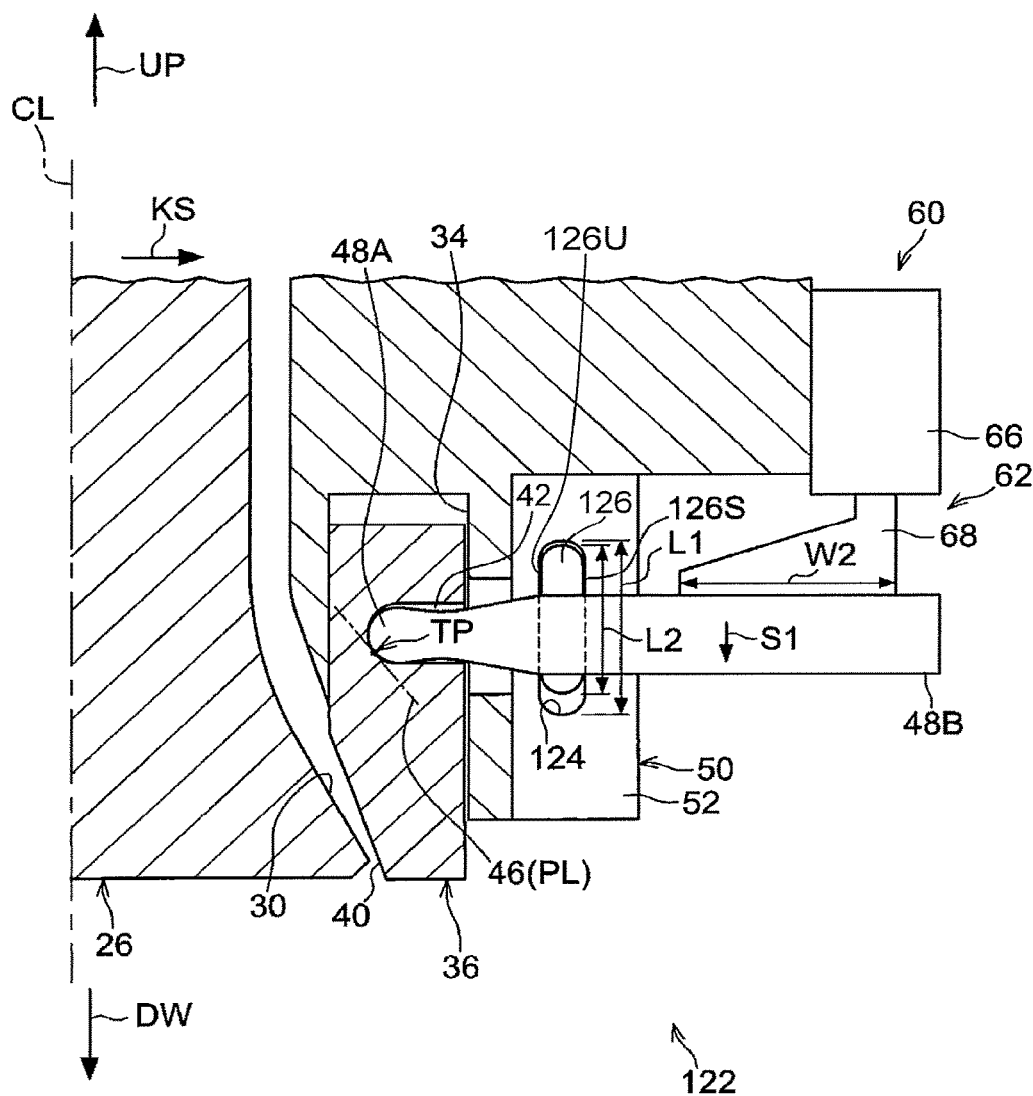
FIG. 10 is a partially enlarged cross-sectional view illustrating a molding apparatus according to a second embodiment.

As illustrated in FIG. 10, in a molding apparatus 122 according to the second embodiment, an elongated cavity 124 is formed in the pair of support plates 52 of the supporting member 50. The length direction of the elongated cavity 124 is aligned with the axial direction of the die 24, and has a length L1.

A housed plate 126 that is housed in the elongated cavity 124 is formed at an intermediate portion of the rod 48. The housed plate 126 has a specific length L2 in the axial direction, and L2<L1. Thus, the housed plate 126 is configured to move along the axial direction while being maintained in a state in which the housed plate 126 is housed in the elongated cavity 124. A radial direction inside face 126U and a radial direction outside face 126S of the housed plate 126 contact the elongated cavity 124 over a specific range in the axial direction. Thus, the rod 48 of the second embodiment is slidable along the axial direction while maintaining an orientation in a direction (the arrow KS direction) orthogonal to the central line CL in FIG. 10.

The piston 68 is fixed to the rear end portion 48B side of the rod 48 over a range with a specific width W2. Thus, downward force over the range of the width W2 acts on the rod 48 when the piston 68 moves toward the second end side in the axial direction (downward), whereby the rod 48 attempts to slide toward the second end side.

In the second embodiment, in order to move the leading end portion 48A of the rod 48 toward the second end side in the axial direction (downward), the actuator 62 is configured to drive the piston 68 to press the rear end portion 48B of the rod 48 toward the second end side in the axial direction (the lower side in FIG. 10). Due to such a configuration, the rod 48 can slide in the arrow Si direction to move the leading end portion 48A toward the second end side in the axial direction as a result.

Thus, there is no limitation to the structure of the first embodiment, in which the rod 48 is rotatable about the support shaft 64, and the structure of the second embodiment, in which the rod 48 is slidable along the axial direction, may be applied. In the second embodiment, the length that the rod 48 is pushed by the piston 68 matches the slide amount of the separator 36 along the axial direction. It is accordingly easy to set and adjust the slide amount of the separator 36.

In contrast thereto, the rod 48 is rotatably supported by the support shaft 64 in the first embodiment. Therefore, a structure in which the rod 48 is retained slidable is not required, unlike in the second embodiment. As a result, the structure can be simplified.

In structures in which the rod 48 itself slides to cause the separator 36 to slide, a high degree of rectilinearity and a high level of positional precision (positional accuracy with respect to the die 24) are demanded of the rod 48. On the other hand, the rod 48 is not connected with the separator 36 in the first embodiment, and the separator 36 is caused to slide due to the rod 48 rotating, and so rectilinearity is not demanded of the rod 48. In the first embodiment, a high level of positional precision is not demanded of the rod 48. As a result, the molding apparatus 22 can be configured at low cost.

In the first embodiment, there is no limitation to the orientation of the rod 48 when the separator 36 is moved toward the second end side in the axial direction. However, as described above, when the rod 48 is rotated in the arrow R3 direction from an orientation along the radial direction of the die 24 (a horizontal orientation) so as to cause the separator 36 to slide, a large slide amount of the separator 36 relative to a rotation angle of the rod 48 can be secured.

When the rod 48 is rotated in the arrow R3 direction from the horizontal orientation, the leading end portion 48A of the rod 48 moves slightly toward the outer side in the radial direction of the die 24. However, in the separator recess 42, the leading end portion 48A of the rod 48 contacts the separator 36 at the sloped plane 46 that slopes toward the open side (the lower side) of the die recess 34 on progression toward the outer side in the radial direction. As a result, the separator 36 can be reliably pushed toward the core 26 side, that is, against the wall portion 38, using part of the force acting on the separator 36 from the leading end portion 48A of the rod 48.

In the molding apparatus according to the present disclosure, the separator recess may, for example, have the respective shapes described below in a third embodiment to a fifth embodiment, rather than the shapes described in each of the above embodiments. In the third embodiment to the fifth embodiment, the overall configuration of the molding apparatus may adopt a similar configuration to that in the first embodiment or the second embodiment, and so illustration thereof is omitted.

Figure 11:
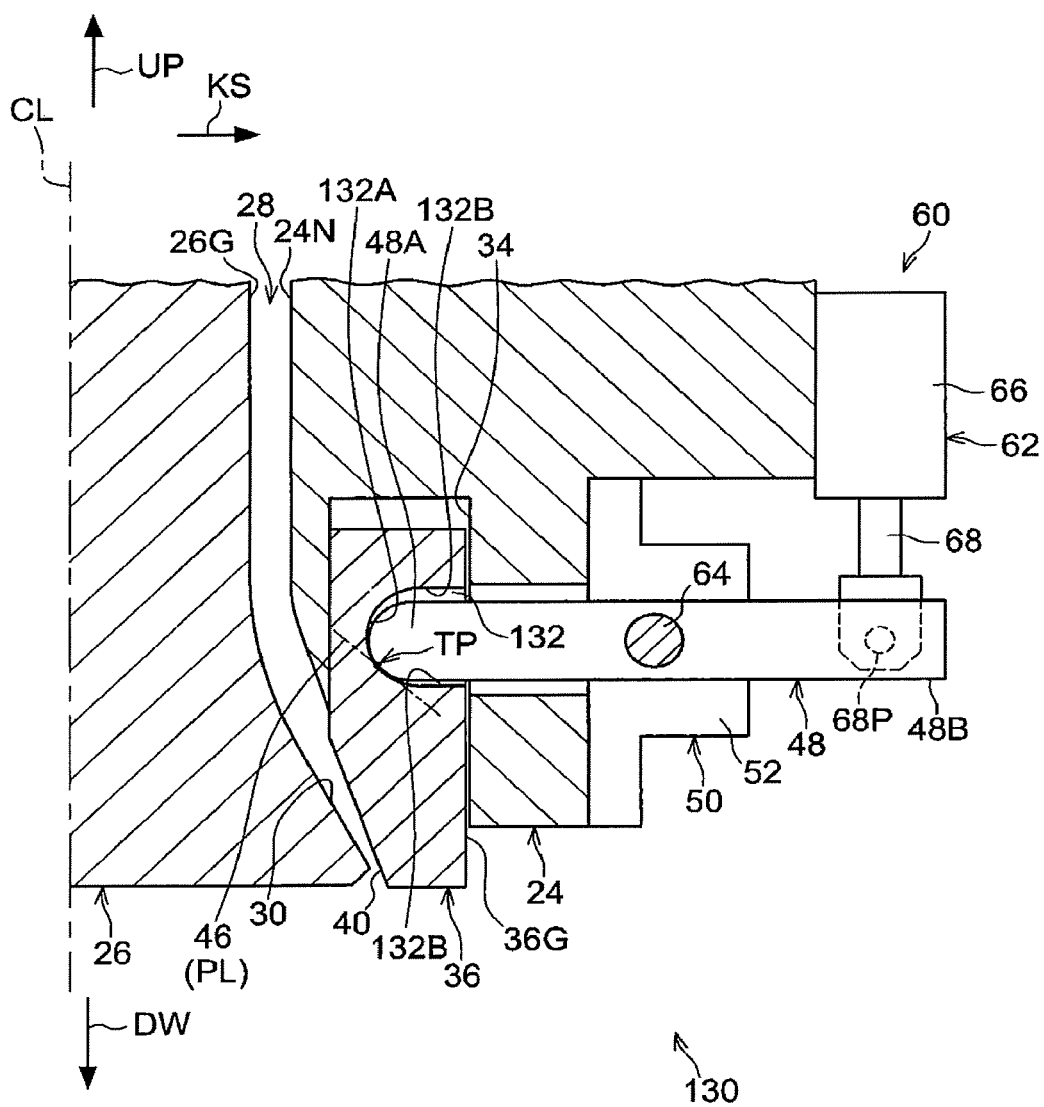
FIG. 11 is a partially enlarged cross-sectional view illustrating a molding apparatus according to a third embodiment.

As illustrated in FIG. 11, in a molding apparatus 130 according to the third embodiment, a separator recess 132 includes a curved face 132A at a bottom side thereof (the location nearest to the central lines CL), and includes a circular column face 132B with a uniform diameter that is continuous to the curved face 132A and extends toward the outer circumferential face 36G at an open side thereof (the location furthest from the central lines CL). The curved face 132A is a semispherical-shaped face with a similar uniform radius to the curved face 42A of the first embodiment. The circular column face 132B is a circular column-shaped face with a uniform diameter that extends toward the outer circumferential face 36G The separator recess 132 therefore has a shape that runs along the radial direction. That is, in the molding apparatus according to the third embodiment, a slider face at the slider recess includes a bottom side portion and an open side portion, and the bottom side portion has a curved face and the open side portion has a circular column face with a uniform diameter that is continuous to the curved face and extends toward an outer circumferential face of the slider.

The leading end portion 48A of the rod 48 contacts the curved face 132A. The tangential plane PL at the contact point TP is the sloped plane 46 that slopes toward the open side (the lower side) of the die recess 34 on progression toward the outer side in the radial direction.

Figure 12:
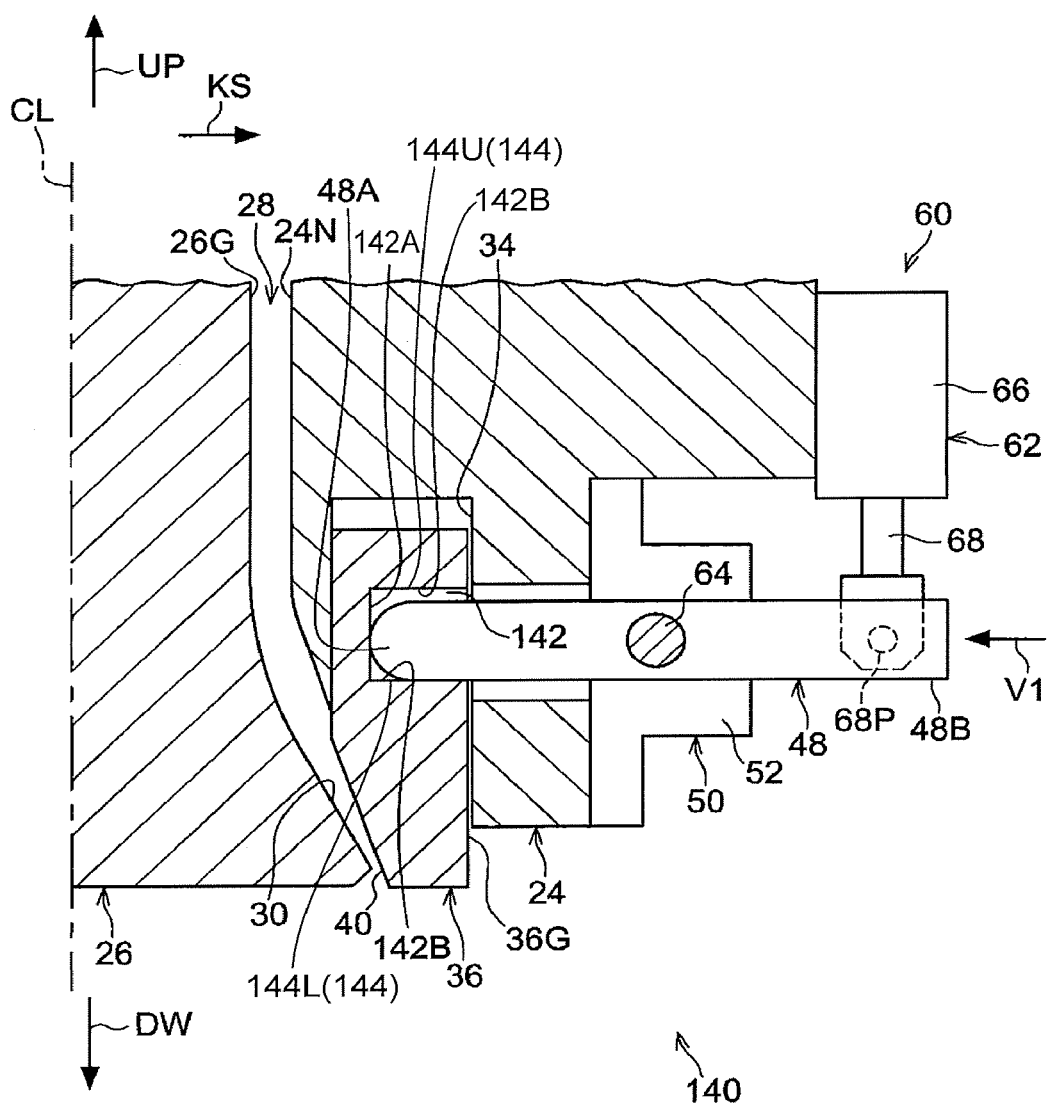
FIG. 12 is a partially enlarged cross-sectional view illustrating a molding apparatus according to a fourth embodiment.

As illustrated in FIG. 12, in a molding apparatus 140 according to the fourth embodiment, a separator recess 142 includes a circular plate face 142A at a bottom side thereof, and includes a circular column face 142B at an open side thereof. The circular plate face 142A is a circular-shaped planar face as viewed from the open side along the arrow V1 direction. Similarly to in the third embodiment, the circular column face 142B is a circular column-shaped face with a uniform diameter that extends toward the outer circumferential face 36G The separator recess 142 therefore has a shape running along the radial direction. That is, in the molding apparatus according to the fourth embodiment, a slider face at the slider recess includes a bottom side portion and an open side portion, and the bottom side portion has a circular plate face and the open side portion has a circular column face with a uniform diameter that extends toward an outer circumferential face of the slider.

Even though boundary lines 144 of the separator recess have a shape running along the radial direction of the die 24 (the boundary lines 144U, 144L are parallel to each other), a structure can be achieved in which force from the rod 48 toward the outer side in the radial direction does not act on the separator 36 when the rod 48 is moved toward the outer side in the radial direction.

Figure 13:
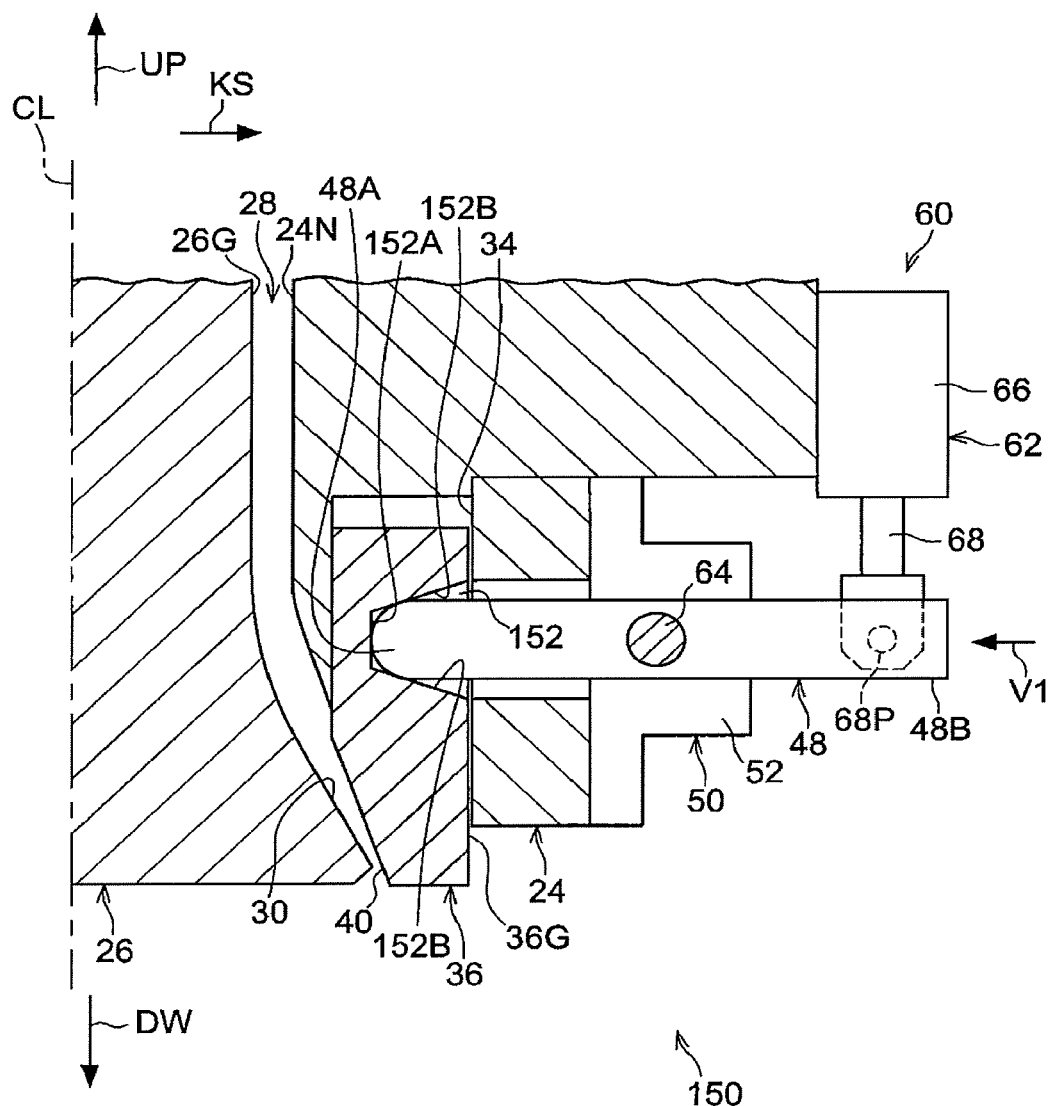
FIG. 13 is a partially enlarged cross-sectional view illustrating a molding apparatus according to a fifth embodiment.

As illustrated in FIG. 13, in a molding apparatus 150 according to the fifth embodiment, a separator recess 152 includes a circular plate face 152A at a bottom side thereof, and includes an increasing diameter face 152B at an open side thereof. Similarly to in the third embodiment, the circular plate face 152A has a circular-shaped planar face as viewed from the open side along the arrow V1 direction. Similarly to in the first embodiment, the increasing diameter face 152B is a circular truncated cone-shaped face that widens on progression toward the outer circumferential face 36G The separator recess 152 therefore has a shape that widens on progression from the inner side in the radial direction toward the outer side in the radial direction. That is, in the molding apparatus according to the fifth embodiment, a slider face at the slider recess includes a bottom side portion and an open side portion, and the bottom side portion has a circular plate face and the open side portion has an increasing diameter face that widens in a circular truncated cone shape on progression toward an outer circumferential face of the slider.

In the fifth embodiment, a structure may be adopted in which the leading end portion 48A of the rod 48 contacts the increasing diameter face 152B. The tangential plane PL at the contact point TP configures the increasing diameter face 152B, and the increasing diameter face 152B also configures the sloped plane 46 that slopes toward the open side (the lower side) of the die recess 34 on progression toward the outer side in the radial direction.

In the fifth embodiment, the separator recess 152 includes the increasing diameter face 152B. That is, the structure is such that force from the rod 48 toward the outer side in the radial direction does not act on the separator 36 when the rod 48 has moved toward the outer side in the radial direction.

In each of the above embodiments, an example has been given in which each separator includes the opposing face 40

(see FIG. 2, etc.) that slopes in a direction that increases the distance from the core 26 on progression toward the second end side (the lower side); however, a separator that does not include such a sloping face may be applied. In a molding apparatus 160 according to a modified example illustrated in FIG. 14, for example, a separator 162 is not formed with a face (the opposing face 40 in FIG. 3, etc.) that slopes in a direction that increases the distance from the core 26 on progression toward the second end side (the lower side). However, the width of the flow path 28 can be changed by causing the separator 162 to slide along the axial direction.

Figure 14:
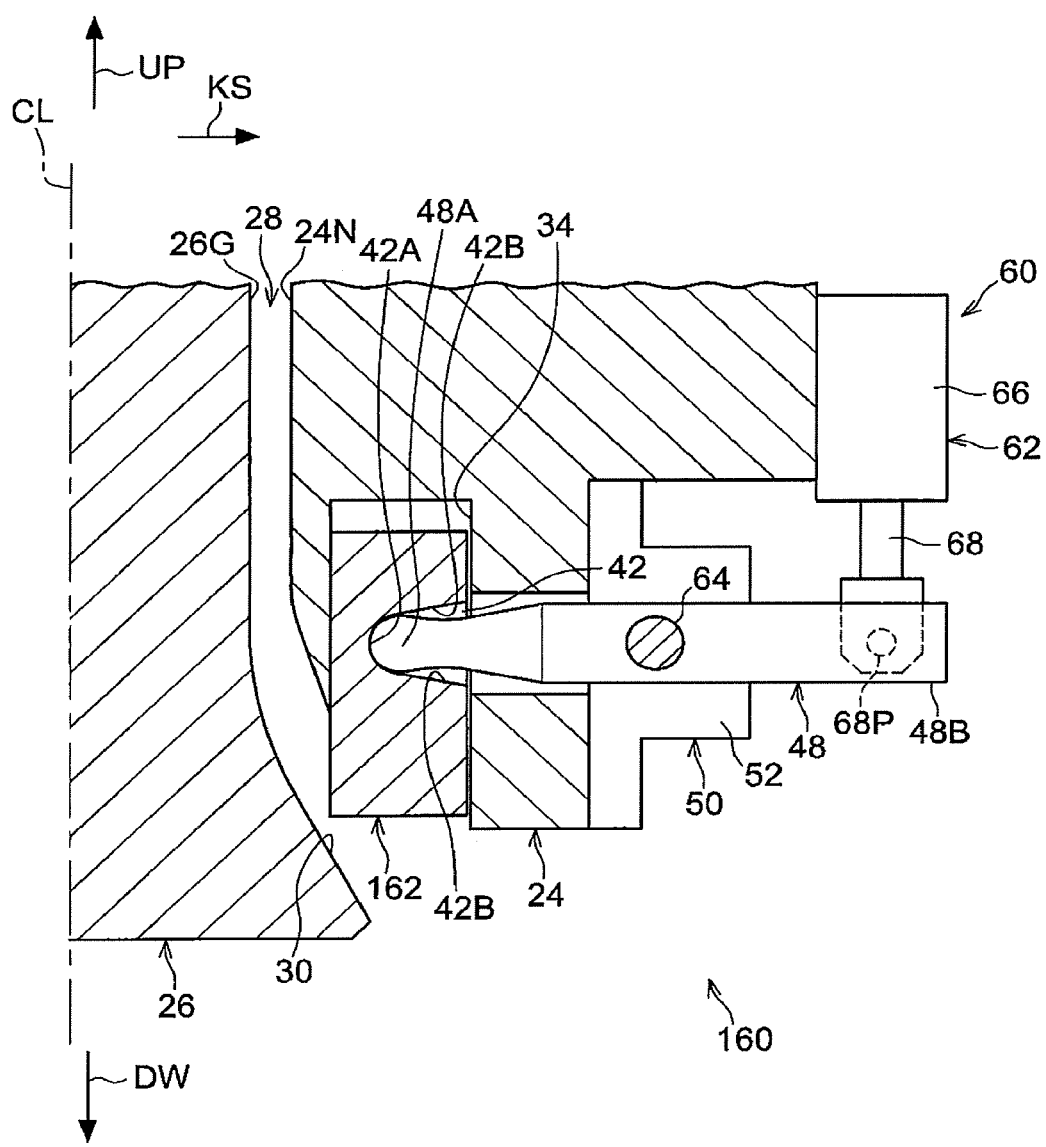
FIG. 14 is a partially enlarged cross-sectional view illustrating a molding apparatus according to a modified example.

In the modified example illustrated in FIG. 14, the overall configuration of the molding apparatus is similar to that in the first embodiment; however, the modified example may be applied to the molding apparatus according to any one of the second to fifth embodiments instead.

Exemplary embodiments have been explained above; however, the present embodiment is not limited to the above-described configuration, and various modifications may be implemented within a range not departing from the spirit thereof.

What is claimed is:

1. A molding apparatus comprising:
   a hollow circular cylindrical die having a first end and a second end in an axial direction of the die;
   a core disposed at an inner side of the die, the core being movable relative to the die in the axial direction of the die, and a flow path for molten resin running from a first end side to a second end side in the axial direction of the die being formed between the core and the die;
   a slider housed in a die recess provided in the die in a state in which there is a gap in a radial direction of the die between the slider and the die, the die recess being open toward the second end side in the axial direction of the die, and the slider being slidable along the axial direction of the die;
   a rod having a leading end portion housed in a slider recess formed in a face of the slider, the face of the slider being at an opposite side from the core side, the leading end portion of the rod being unconnected with the slider, and the rod being configured to cause the slider to slide along the axial direction of the die due to the leading end portion moving along the axial direction of the die; and
   a movement mechanism attached to the die, the movement mechanism being configured to move the leading end portion of the rod along the axial direction of the die,
   the die including a wall portion that forms part of an inner wall of the die recess and that is positioned at the core side of the slider, and the slider recess having a shape that widens on progression toward an outer side in the radial direction of the die or that runs along the radial direction of the die.

2. The molding apparatus according to claim 1, wherein, in the slider recess, a tangential plane at a contact portion at which the leading end portion of the rod contacts the slider is a sloped plane that slopes toward an open side of the die recess on progression toward the outer side in the radial direction of the die.

3. The molding apparatus according to claim 2, wherein the movement mechanism comprises:
   a support shaft that supports an intermediate portion of the rod so as to permit rotation of the rod, and
   an actuator configured to move a rear end side of the rod toward the first end side in the axial direction of the die.

4. The molding apparatus according to claim 3, wherein the actuator is configured to move the rear end side of the rod toward the first end side in the axial direction of the die from an orientation in which the rod runs along the radial direction of the die.

5. The molding apparatus according to claim 1, wherein the rod is retained slidable along the axial direction of the die.

6. The molding apparatus according to claim 1, wherein a slider face at the slider recess includes a bottom side portion and an open side portion, the bottom side portion having a curved face and the open side portion having an increasing diameter face that is continuous to the curved face and widens in a circular truncated cone shape on progression toward an outer circumferential face of the slider.

7. The molding apparatus according to claim 1, wherein a slider face at the slider recess includes a bottom side portion and an open side portion, the bottom side portion having a curved face, and the open side portion having a circular column face with a uniform diameter that is continuous to the curved face and extends toward an outer circumferential face of the slider.

8. The molding apparatus according to claim 1, wherein a slider face at the slider recess includes a bottom side portion and an open side portion, the bottom side portion having a circular plate face, and the open side portion having a circular column face with a uniform diameter that extends toward an outer circumferential face of the slider.

9. The molding apparatus according to claim 1, wherein a slider face at the slider recess includes a bottom side portion and an open side portion, the bottom side portion having a circular plate face, and the open side portion having an increasing diameter face that widens in a circular truncated cone shape on progression toward an outer circumferential face of the slider.

* * * * *